May 1, 1956  C. USCHMANN  2,743,758
FIBER MAT FORMING APPARATUS AND METHODS
Filed Nov. 13, 1950  6 Sheets-Sheet 1

INVENTOR.
CURT USCHMANN
BY
ATTORNEYS

May 1, 1956 C. USCHMANN 2,743,758
FIBER MAT FORMING APPARATUS AND METHODS
Filed Nov. 13, 1950 6 Sheets-Sheet 2
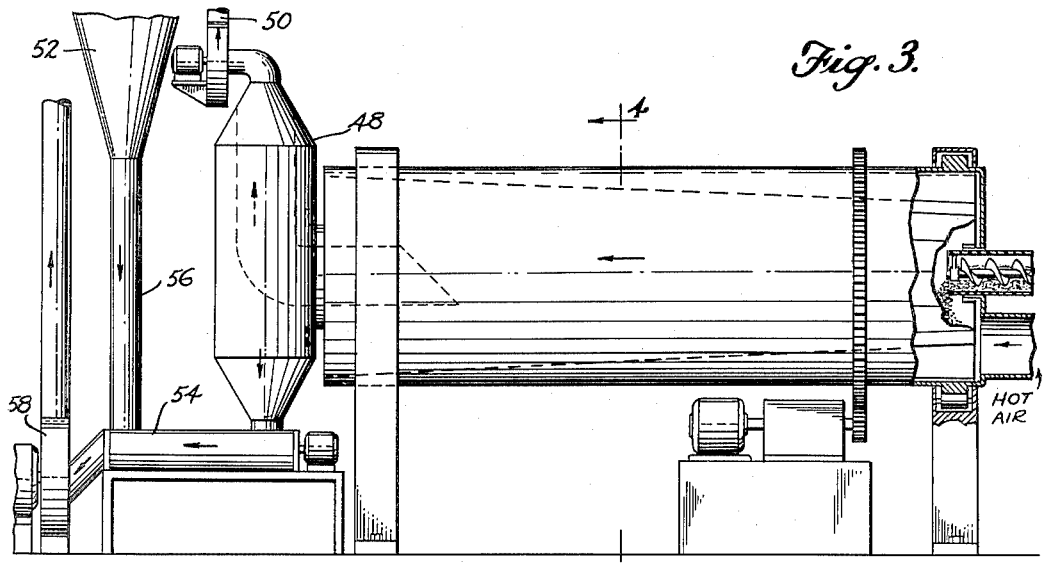
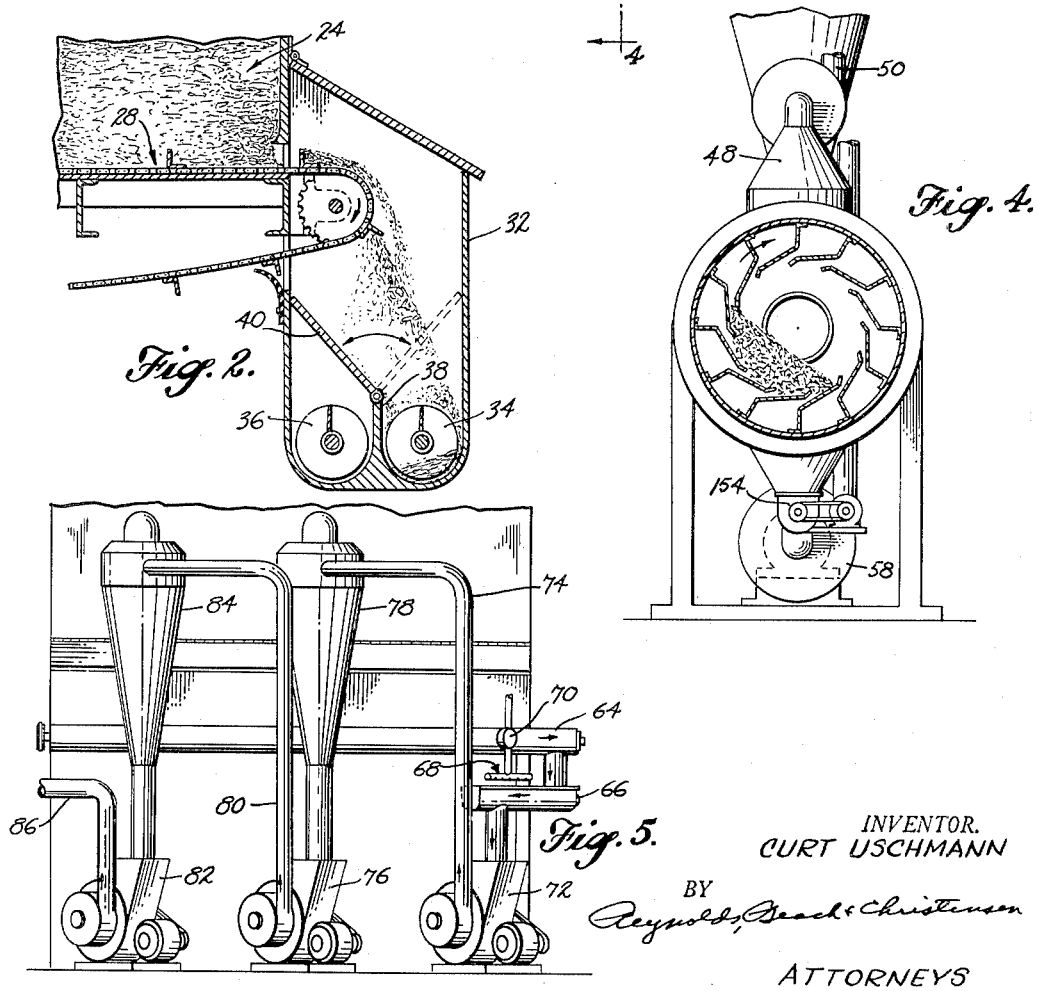
INVENTOR.
CURT USCHMANN
BY
ATTORNEYS

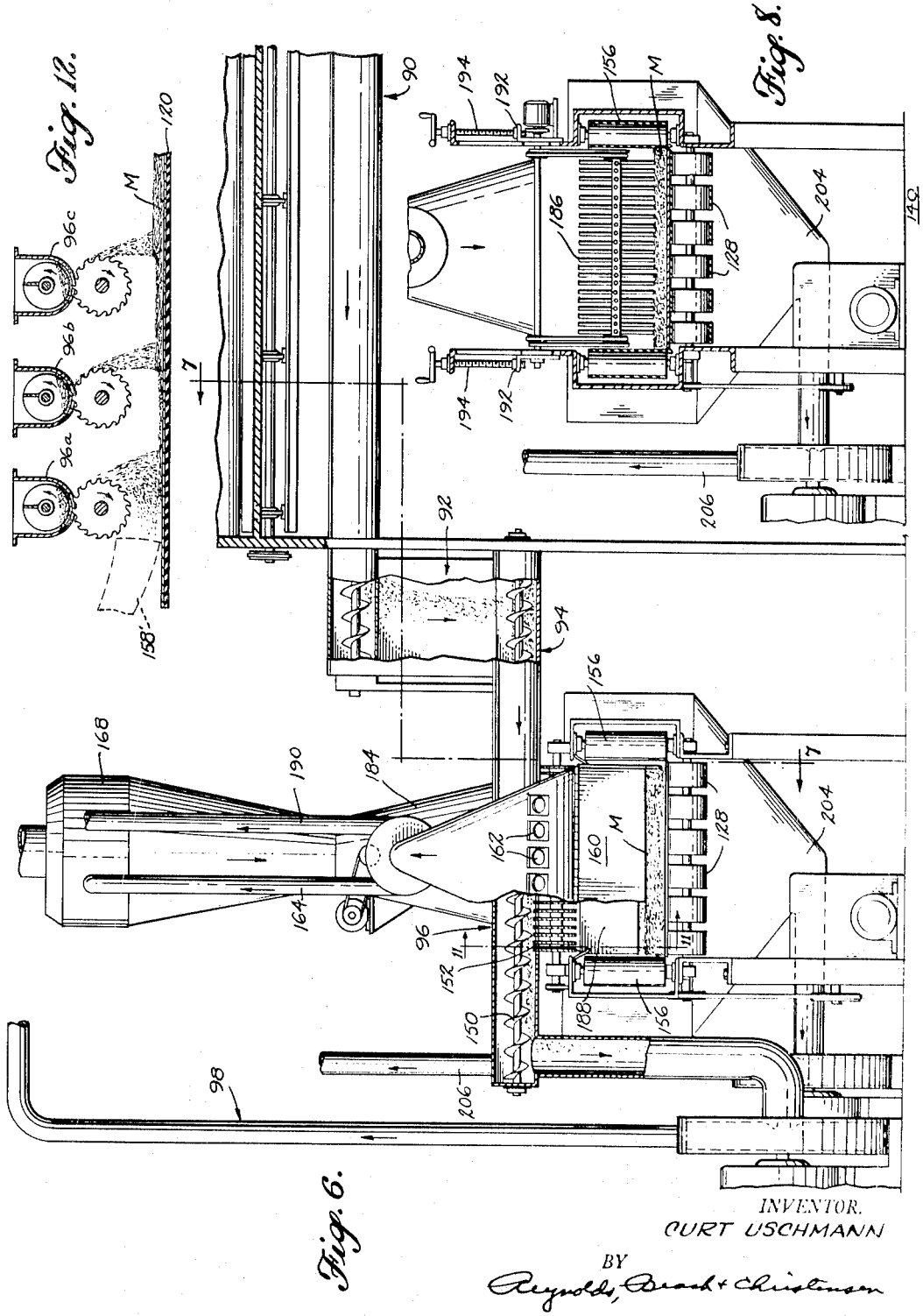

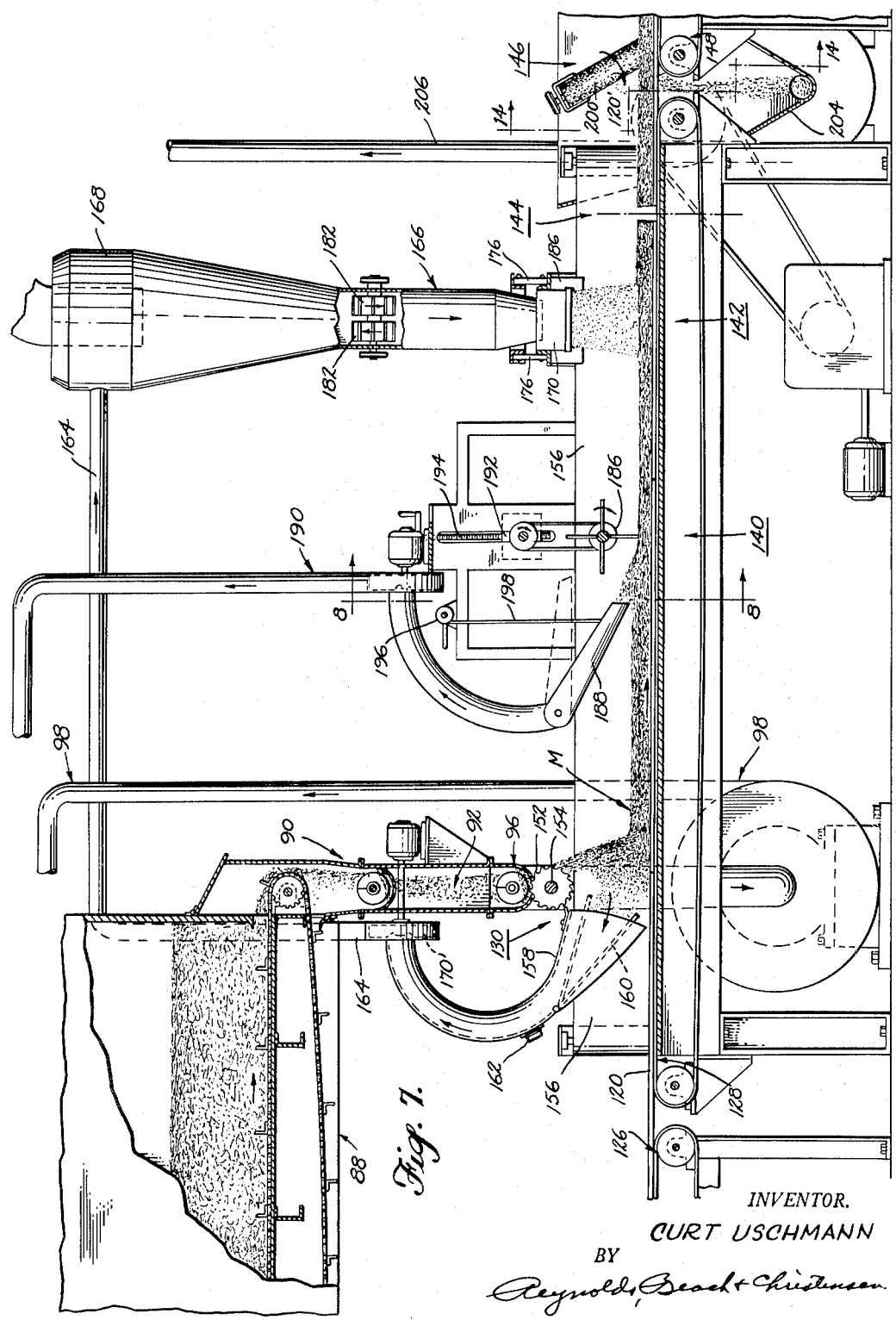

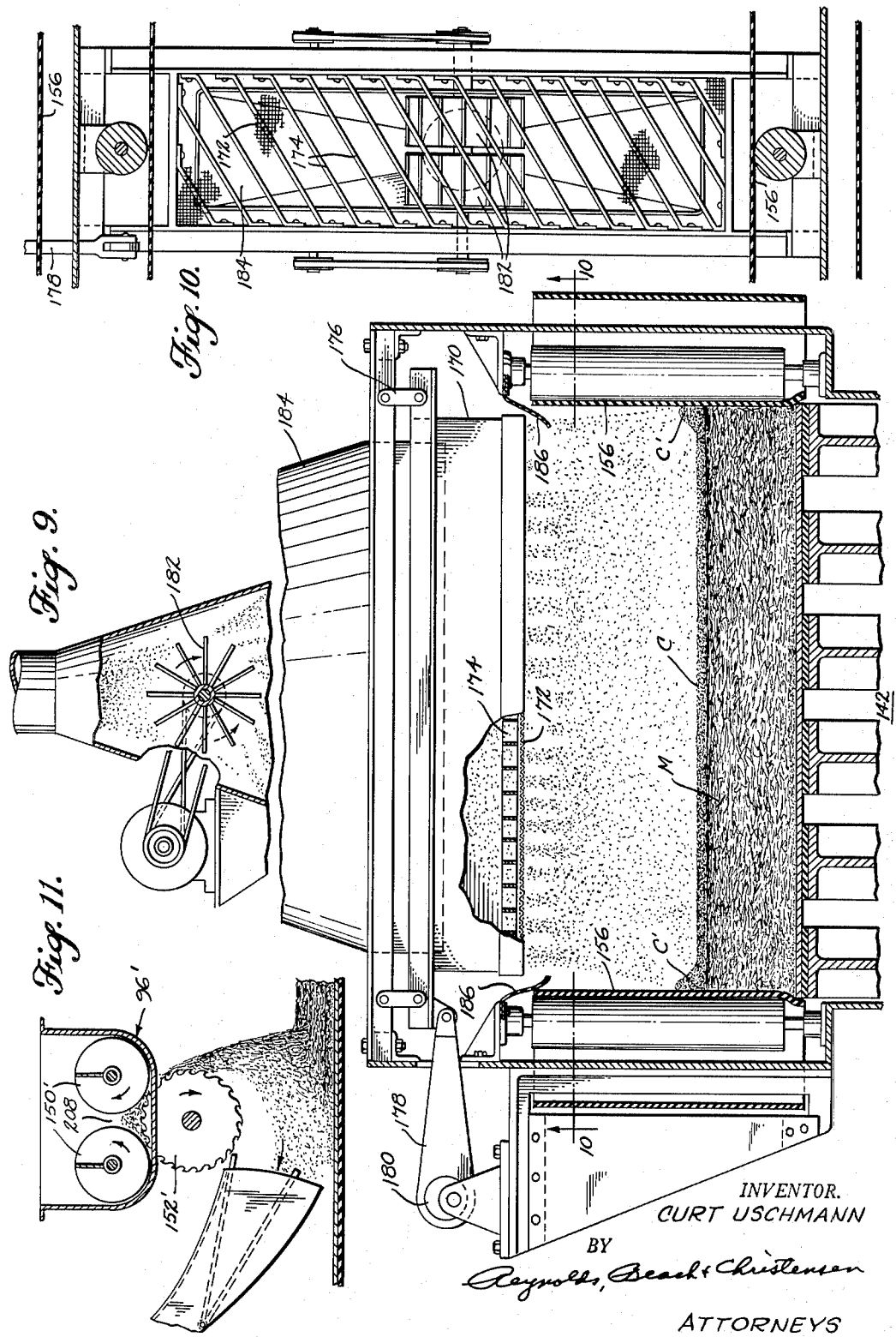

May 1, 1956 C. USCHMANN 2,743,758
FIBER MAT FORMING APPARATUS AND METHODS
Filed Nov. 13, 1950 6 Sheets-Sheet 6

INVENTOR.
CURT USCHMANN
BY
Reynolds, Beach & Christensen
ATTORNEYS

United States Patent Office 2,743,758
Patented May 1, 1956

2,743,758

FIBER MAT FORMING APPARATUS AND METHODS

Curt Uschmann, Lebanon, Oreg., assignor to Cascades Plywood Corporation, Portland, Oreg., a corporation of Delaware Application November 13, 1950, Serial No. 195,267

23 Claims. (Cl. 154—1)

This invention relates to fiberboard manufacturing apparatus and methods, and especially to improved fiberboard products and novel apparatus and methods employed in forming the preliminary fibrous mats resulting in such products. The invention is concerned in particular with the manufacture of an improved hardboard product, or the like, although it is equally applicable in connection with the manufacture of relatively soft fiberboard, and is in the nature of an improvement on the process and mechanism disclosed in my Patent No. 2,579,770.

A general object of the invention is to make a fiberboard product characterized by a uniformly fine texture surface layer unmarred by the presence of coarse fibers, which latter are confined largely in the core or interior body portion of the board. In accordance with the invention such a product may be manufactured economically from the ordinary run of fibers produced by an attrition mill or other defiberizer, as for manufacture of common types of fiberboard or hardboard, and the entire discharge of the mill, which includes the coarse body fibers and fine dust fibers, intermixed, may be utilized.

In the usual method of manufacturing fiberboard from a mass of random size fibers a preliminary mat in wet pulpy condition is formed with the different size fibers distributed throughout the mass. When the final board product emerges from the press, an examination of its cross section will reveal that its original more or less uniform distribution of different size fibers has been generally preserved, and that its surfaces have a coarse fibrous appearance and texture because of the presence of coarse body fibers intermingled with the finer particles.

While the fibrous material used in the manufacture of hardboard, for example, can be ground until generally all of the fibers are below a certain small size to avoid the foregoing surface characteristics in the final product, this extra-fine grinding of the fibers requires more grinding and results in a board product which is not as strong and tough throughout as in the case of a fiberboard product, such as that described herein, in which interwoven long fibers are also retained.

My invention broadly contemplates the general derivation or separation of at least a substantial proportion of the very fine fibers of "fiber dust," as herein termed, from the coarse body fibers present in the fibrous mass as economically produced by an attrition mill grinding operation or the like. Such derivative is then concentrated on one or both surfaces of the preliminary mat before delivery thereof to the curing press. The resulting board product then possesses fine texture surfaces capable of receiving finishes more satisfactorily, and presenting a more attractive natural appearance.

Preferably, the wood chips or other fibrous material to be converted into the fibrous material are ground in greenwet condition in order to obtain a better form of fiber than would be obtained by grinding chips which are too dry. After grinding the resulting fibrous particles are dried until the moisture content has been reduced to a value as low as possible to reduce the drying time in the press, yet high enough to meet the thermo-setting requirements of the particular binder employed. The fibrous mass is thoroughly impregnated with the binder and, in substantially dry state, is then formed into the fibrous mat having the described distribution of fibers according to general size or degree of fineness.

A further object of the invention is an economical and simple technique for separating a substantial proportion of the dust fibers from the general fibrous mass for application as a mat surface layer, as an integral step in a continuous mat forming process. In accordance with the invention such an object is accomplished by creating a general dispersion stream of the substantially dry fibrous material, in which the intermingled dust fibers and coarse body fibers are showered on a collecting surface moved progressively flat wise at a uniform rate beneath the dispersing device. A steady cross current of air deflects a substantial proportion of the fine dust fibers from the stream of fibers to an offset location ahead of or behind the general path of fall of the coarse fibers in relation to the direction of movement of the collecting surface. Accordingly, in the preferred case, the deflected dust fibers fall on the collecting surface ahead of the coarse body fibers, or at least ahead of those coarse fibers which are deflected to a lesser extent by the cross current of air than the fine dust fibers, and form a lower fine texture surface or base layer.

In the preferred application of the invention the upper mat surface is likewise formed of fine texture fibrous material segregated from the coarse body fibers. An continuous source of fiber dust covering material is obtained by creating the dust-separating cross current of air with a suction head which deflects some of the fine dust fibers from the general stream of fibers merely into an offset path of fall, and draws the rest of the dust completely into the suction head. From such head the fine fibers are suitably conveyed to a fiber dust dispersing apparatus located above the path of movement of the fiber mat and continuously operated to sprinkle the fine dust fibers in a uniform covering layer on such mat, as desired.

The proportional amount of fiber dust merely deflected from the stream of fibers to fall on the traveling collecting surface ahead of the heavier body fibers of the mass, and the proportional amount of dust completely withdrawn by the suction head for delivery to the fiber dust depositing device, respectively, may be varied by suitable means cooperating with the suction head to vary the suction flow therein.

In order to establish the mat thickness at a uniform controlled value, the novel apparatus further includes a leveling device in the form of a rotary toothed member which rakes excess surface material from the mat and toward a second suction head which returns it to the source hopper for recirculation to the initial fiber dispersing means. Such leveling apparatus is located ahead of the fiber dust depositing means, so that it will not disturb the relatively thin fine dust fiber layer deposited on the core layer of relatively coarse body fibers.

An additional object is to provide for adjustment of such leveling device, so as to produce fiber mats of thickness corresponding to finished boards of various desired thicknesses. In particular it is an object by such technique to enable a very thin finished hardboard to be manufactured, which may be as thin as 1/32 of an inch, or at least 1/16 of an inch in thickness.

It will be appreciated that certain features of the invention and aspects of the method are generally applicable to the manufacture of board products from other types of materials than fibrous materials. For example, the concept of deflecting the relatively fine or dust-like particles from a general dispersion stream of material in a mat forming operation whether of fibrous or granular form, in order to form an underlying fine texture deposit layer upon which coarser materials fall, or in part as a supply or surfacing material, may have a number of useful applications other than the manufacture of wood fiber hardboard.

Another object of the invention is to provide an improved method and apparatus for the manufacture of fiberboard which enables the preliminary loose mat of fibrous material, such as that mentioned herein, to be moved to the curing press without impairment of its original loose mat form even though it is not compacted preliminarily by prepressing. Such a prepressing operation, which could be accomplished by passing the preliminary mat beneath one or more pressure rolls, would tend to prevent the square sides of loose uncured preliminary mats supported on individual caul plates while being moved into the press from sloughing off and interfering with the handling mechanism or creating a serious edge defect in the finished board removable only by excessive marginal trimming. In order to avoid edge crumbling, yet to simplify the over-all process by omitting the prepressing step, the present invention further includes the provision of mechanism for banking off or beveling the side edges of the loose and fluffy preliminary mat. The edge materials then will not tend to slough off under moderate shock or vibration during handling. Preferably such beveling is effected by a pair of inclined rotary brushes between which the preliminary mat is advanced on its supporting caul plate.

As a further simplification and saving, and to divide the endless mat deposit into board length sections on separate caul plates, a series of such caul plates is moved at uniform rate progressively flat wise in end-abutted relation beneath the dispersing apparatus. As the caul plates successively reach a selected separating station, each one is accelerated relative to the others by more rapidly moving conveyor mechanism. Such relative acceleration of the leading caul plate detaches the mat section supported thereon from the general continuous body of mat supported on the succeeding caul plates. Such a technique for tearing the mat into board-length sections avoids the mechanical complexities and extra cost of high speed traveling cut-off saws or the like, capable of cutting off board lengths from a continuously moving mat.

Further objects of the invention and corresponding features thereof reside in the provision of fiber dispersing mechanism having large production output capacity and enabling the manufacture of fibrous mat or the like from interlacing multiple layers of the same or different fibrous materials. Such mechanism generally comprises a number of separate dispersing units arranged in series along the line of movement of the collecting surface. Each such unit deposits a layer of fibrous material upon that deposited by the preceding unit. Such units may be fed from a common supply source of a single type of fibrous material, or from separate sources of different fibrous materials, according to preference.

In one form of dispersing apparatus fiber is supplied to the bottom trough of a supply hopper by a pair of spaced parallel screw conveyor elements instead of a single conveyor, and multiple-toothed disks extract wisps of fiber in continuous fashion from the hopper and shower them uniformly on the collecting surface. Conjoint rotation of these conveyor elements maintains a steady moving supply of fiber piled uniformly at all times over and upon the slotted trough bottom for extraction by the toothed rotary elements.

These and other features, objects and advantages of the invention, including various details of construction of preferred forms thereof are discussed more fully in the following description and shown in the accompanying drawings.

Figure 2 is a transverse sectional detail of conveyor mechanism at the output end of the supply hopper receiving fibrous material from a source such as an attrition mill, the view being taken on line 2—2 in Figure 1.

Figure 3 is a side elevation view of suitable drying apparatus and associated conveyor mechanism components, as seen from view line 3—3 in Figure 1.

Figure 4 is a transverse sectional view through the drier taken on line 4—4 in Figure 1.

Figure 5 is a side elevation view of suitable apparatus for mixing the fibrous mass with binder as a preparatory step in the mat forming operation, the view being seen from line 5—5 in Figure 1.

Figure 6 is a transverse sectional view of a portion of the mat forming apparatus taken on line 6—6 in Figure 1.

Figure 7 is a longitudinal vertical section with relatively offset portions, taken on line 7—7 in Figure 6.

Figure 8 is a transverse sectional view through the mat forming apparatus proper, taken on line 8—8 in Figure 7.

Figure 9 is a transverse sectional view taken on line 9—9 in Figure 1 and showing details of the fiber dust depositing apparatus.

Figure 10 is a horizontal sectional view looking upward taken on line 10—10 in Figure 9, and showing further details of such apparatus.

Figure 11 is a transverse sectional view of a modified fiber dispersing mechanism, as used in the disclosed mat forming system, the view being taken at a location corresponding to the line 11—11 in Figure 6.

Figure 12 is a sectional view showing, in elevation, a series type of fiber dispersing mechanism, as may be used alternatively in the disclosed system.

Figure 1:
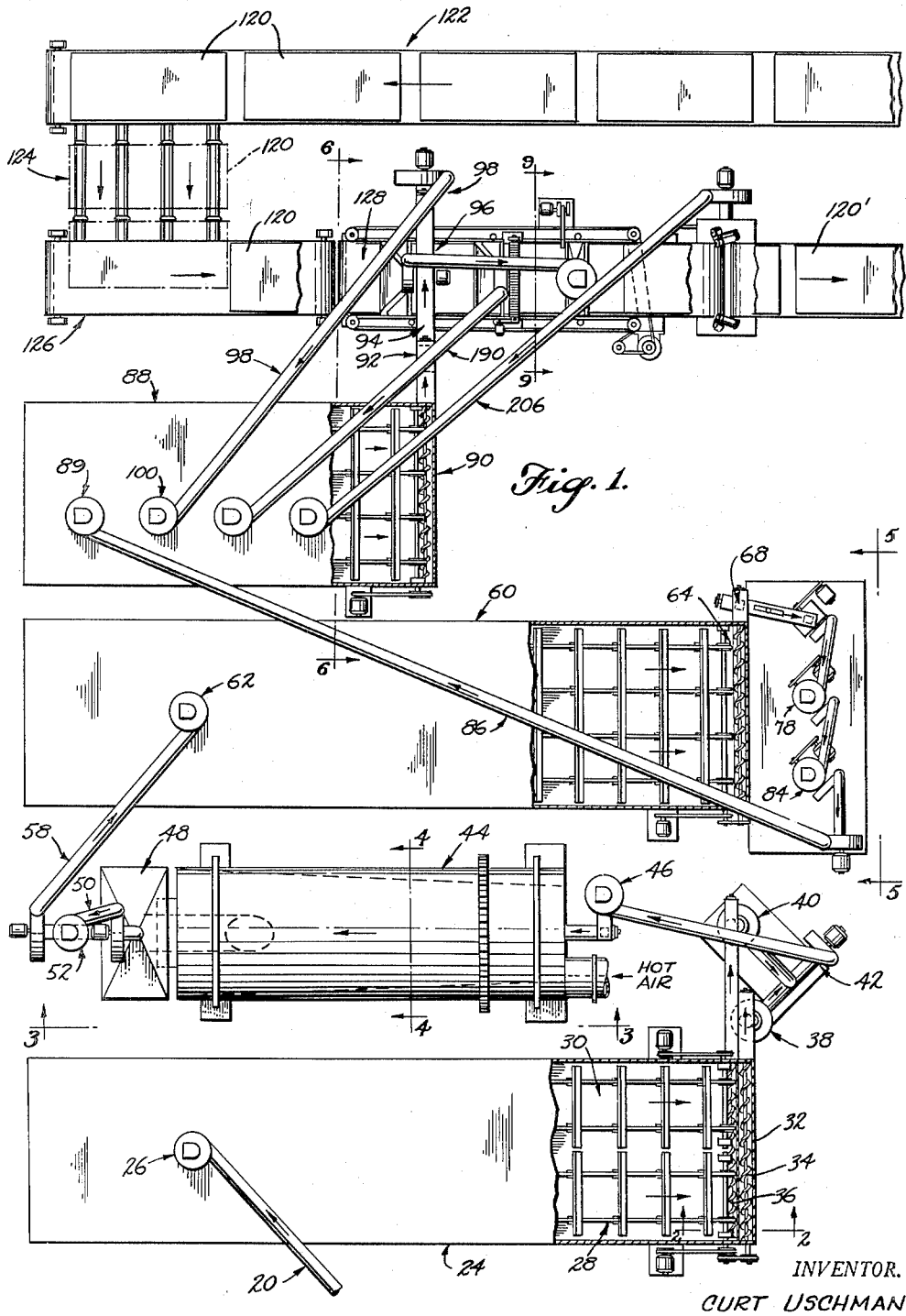
Figure 1 is a general plan view of a mat forming system incorporating apparatus of the present invention.

In the general plan of Figure 1, representing a typical layout of an illustrative continuous output system, the wood chips, shavings or other raw material are delivered by suitable means such as a pneumatic conveyor 20 to the receiving or storage bin 24, by a cyclone collector 26, which allows the chips to drop into the bin free of the rapidly moving air stream entering the collector. Dual endless drag conveyors 28 and 30 traveling over the bottom of the bin transfer the raw material continuously to the discharge end of the bin, from which it drops into a conveyor trough 32 having in it dual screw conveyor elements 34 and 36 separated by a bottom partition 38, as shown in Figure 2. A diverting flap 40 hingedly supported on the upper edge of the partition 38 is adjustably movable between extreme positions in which one or the other of the screw conveyor channels in the trough bottom receives all of the chip material discharged from bin 24, through intermediate positions in which varying proportions of such material drop into the respective conveyor channels.

In the illustrated case the screw conveyors 34 and 36 deliver the chip material to separate grinders 38 and 40, respectively, of the attrition type or other suitable type for converting the wood chips or the like into the fibrous material for making the desired fiberboard product. Separate controls (not shown) for the dual conveyors 28 and 30, the screw conveyors 34, 36 and the attrition mills 38 and 40 are employed for greatest versatility and convenience in maintenance and operation of the system. Thus one of the conveyors 28 and 30 only may be operated and may dump material into one or the other of the screw conveyors 34 and 36, or into both of these conveyors in any proportion. Alternatively both conveyors 28 and 30 may be operated to dump material into one or the other of the screw conveyors 34 and 36 separately. If the partition 40 is adjusted in approximately mid position, substantially equal amounts of the material delivered by both conveyors 28 and 30 will be discharged into the two conveyors 34 and 36, or such discharge may be proportioned in any desired ratio between the two screw conveyors.

It is preferred that the wood waste be fiberized in its initial green-wet condition instead of after being dried, to avoid the formation of excess amounts of fine granular dust in the grinding operation. The fibrous material in its natural green-wet state contains between about forty percent and eighty percent by weight of moisture, and the moisture content is reduced by the grinding operation. Fewer dust particles will thus be produced and the major proportion of dust-size particles will be in the form of fine fibers which can be used in my process to make a fine-textured surface covering layer, yet strong because of interlacing of the fiber dust particles.

From the attrition mills the fiber is delivered by the pneumatic conveyor system 42 to a rotary type dryer 44 of conventional commercially available form, by way of the cyclone separator 46, to reduce further the moisture content. Figure 4 illustrates in cross section the general interior construction of one satisfactory commercially available dryer which may be used in reducing the moisture content of the fiber to the desired point for incorporation of binder. In preferred cases the moisture content of the material discharged by the dryer 44 will range from about eight percent to fourteen percent by weight, depending upon the moisture required to meet the specifications for a particular thermo-setting binder material in producing the desired end product. It will be understood, however, that such factors as moisture content, type of binder, and the like, are not a part or limitation of the present invention.

From the dryer 44 the fiber passes into a hopper 48, from which some of it is blown by a pneumatic conveyor 50 (Figure 3) into a cyclone collector 52 for separation from the heated air stream. The remainder of the dryer discharge drops directly through the bottom of the hopper 48 and into a duct 54 joined by the bottom outlet duct 56 of the cyclone collector 52, and leads into the intake of the pneumatic conveyor 58, by which the partially dried fiber is conveyed to a second bin 60, through cyclone collector 62.

The bin 60 has a single full-width drag conveyor moving over its bottom surface to transport the fibrous mass continuously to the discharge end of this bin and into the trough of a transversely running screw conveyor 64 (Figure 5). At the discharge end of this screw conveyor the material drops into a second screw conveyor 66 wherein it moves beneath a binder dispenser 68. Binder, either in liquid or powder form, is discharged by this dispenser into the fibrous mass at a selected steady rate regulated by the metering device 70. The resulting aggregate then drops into a first stage mixer 72, the function of which is to tumble or knead the mass in order to obtain uniform binder impregnation. Various types of mixing devices may be used for this purpose. For instance, a screening-type hammermill with discharge blower is one suitable type of mixer. From the first stage mixer 72 the fibrous mass is transferred by a pneumatic conveyor 74 to a second stage mixer 76, through the cyclone collector 78, and from there by a similar pneumatic conveyor 80 to a third stage mixer 82 through the cyclone collector 84. Any number of mixing stages may be used in accordance with the proportion and nature of the binder and the required degree of blending of the binder into the fibrous mass to obtain sufficient homogeneity.

From the last mixer stage the binder-impregnated fibrous mass is conveyed by suitable means, such as the pneumatic conveyor 86, through cyclone collector 89 and to the storage bin 88. Such bin preferably is of a generally similar construction to the receiving bin 60, although somewhat shorter. At the discharge end of the storage bin 88 the substantially dry and fluffy fibrous material drops into a transversely running screw conveyor 90 by which it is transferred to a vertical chute 92, as shown in Figure 7. Such material falls through the chute to a lower level screw conveyor 94, the trough bottom of which is level with the trough bottom of the fibrous mass dispersing device hopper 96. From this hopper wisps of the fiber material are extracted by rotating toothed elements and dispersed on a moving collecting surface generally in accordance with the principles disclosed in my Patent 2,579,770, mentioned above. As described in that patent, a certain amount of the fiber is moved completely through and beyond the dispersing device hopper 96, for recirculation. In this case the pneumatic conveyor 98 returns such overflow material back to the storage hopper 88 through the cyclone collector 100, as shown in Figures 1 and 6.

The present invention is principally concerned with the method and associated apparatus applicable to the handling of the fiber after delivery by the screw conveyor 90 to the fiber dispersing device hopper 96, that is with the technique of forming the preliminary mat which ultimately results in the fiberboard end product.

In the preferred and illustrated application or embodiment of the invention, the collecting surface upon which the fiber dispersing device 96 showers its steady discharge of loose, and fluffy fibrous material is made up of a series of end-abutting board-size caul plates 120. These caul plates remain with their respective blanketing layers of fibrous material throughout the fiberboard manufacturing process and are the means for imparting a smooth finish to the lower face of the fiberboard product when the same is compressed and heated in a curing press. The press and associated handling mechanism for loading and unloading it, and the complete arrangement for returning the caul plates in the mat forming circuit for reuse are not illustrated in the drawings, being of any suitable type. However, a caul return conveyor 122 is shown. This conveyor returns the individual caul plates in succession for reuse in the mat forming process. When the caul plates reach the end of this conveyor each in turn is transferred by a suitable shuttle conveyor 124 to a caul delivery conveyor 126, which abuts the aligned and somewhat slower moving assembly, or mat forming conveyor, 128, as shown.

Because delivery conveyor 126 operates at a slightly greater speed than mat forming conveyor 128, a returning caul plate placed on such delivery conveyor overtakes the immediately preceding caul plate on the latter. The caul plates carried by the return conveyor are spaced closely enough and reach the delivery conveyor 126 in sufficiently quick succession that this overtaking operation is accomplished before a caul plate on the mat forming conveyor 128 moves out of range of the succeeding plate being advanced by the delivery conveyor. Once the edges, preferably the end edges, of these caul plates are abutted, their relative positions remain unchanged until a later point in the process, as hereinafter described. Slippage is permitted between the surface of conveyor 126 and such an end-abutted caul plate thereon in order to avoid over-running of such caul plate upon its neighbor.

Figure 14:
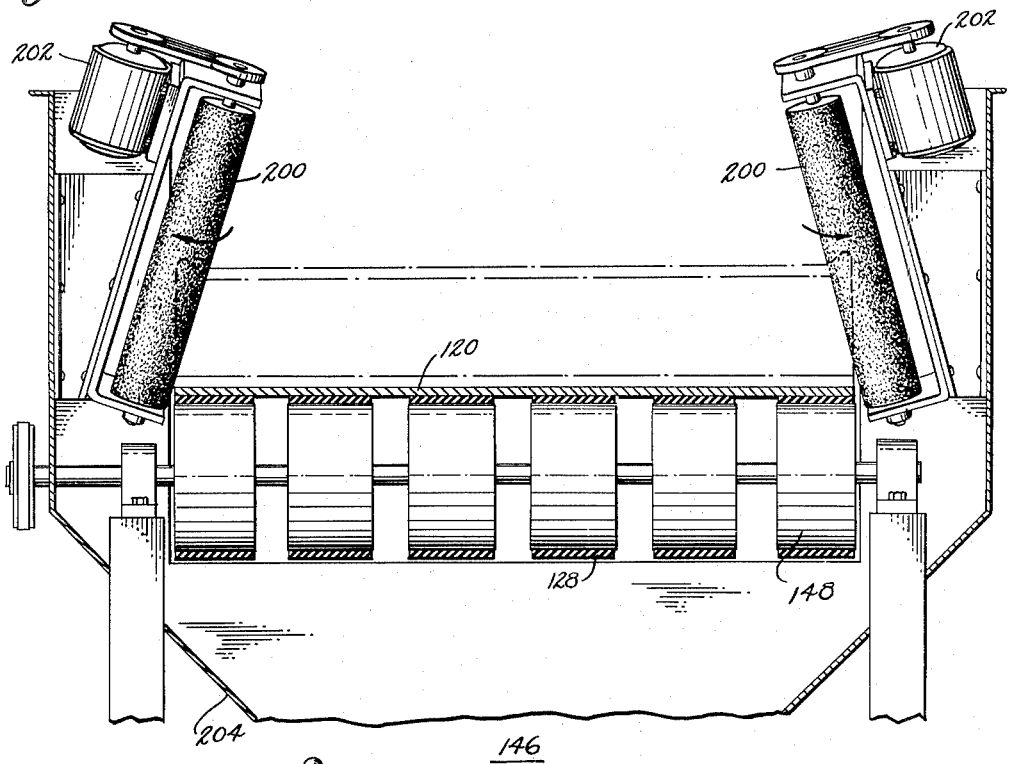
Figure 14 is a transverse section taken on line 14—14 of Figure 7, and showing beveling mechanism for banking off the sides of the preliminary mat formed by the apparatus.

The succession of end-abutted cauls, constituting the fibrous material collecting or receiving surface moved by mat forming conveyor 128, advances progressively past a fiber dispersing station 130 (Figure 7), a mat leveling station 140 (Figures 8 and 13), a fiber dust depositing station 142 (Figure 9), a mat section detaching point 144, and an edge-beveling station 146 (Figure 14). The nature and importance of the operations at these respective stations or points will be explained in detail in connection with the description of the associated apparatus components. The caul plates leaving the mat forming conveyor 128 are carried off by an offbear conveyor 148 extending in alignment with such mat forming conveyor. The offbear conveyor 148 moves somewhat faster than the mat forming conveyor 128, for a purpose to be explained.

With particular reference to Figures 6 and 7, it will be seen that the fiber dispersing unit comprises the elongated shallow hopper 96 having a trough-like bottom, in which the screw conveyor element 150 rotates to advance the fibrous material through the hopper progressively in a direction transverse to the line of movement of mat forming conveyor 128. As in my earlier patent the hopper bottom has in it closely spaced, parallel slots. A series of toothed rotary elements or saw-like disks 152 rotate on a common arbor 154 extending parallel to the overlying hopper bottom. The upper peripheral portions of the saws enter the hopper bottom through the respective slots therein to extract wisps of fiber continuously from the hopper, and as the saws rotate their teeth fling such material in a steady shower or stream onto the moving collecting surface made up of the end-abutted caul plates 120. The material feed rate in the hopper, the rate of rotation of the dispersing saws, and the rate of movement of the collecting surface established by conveyor 128, are so related as to produce the desired deposit or thickness of the loose mat M formed on the collecting surface.

Upright retaining surfaces on both sides of the horizontal moving collecting surface are provided by the endless belts 156 (Figure 9) of fabric reinforced rubber, or other flexible belting material. This belting extends preferably continuously between the fiber dispersing station 130 and fiber dust depositing station 142 and beyond the latter, as shown in Figure 7.

An important step in the mat forming process according to the present invention is the creation of a cross current of air relative to the general stream of fibers being showered on the collecting surface by the dispersing unit disks 152. In the illustrated case this air cross current is produced by directing the suction head 158 at the fiber cascade in the manner illustrated in Figure 7. This transversely moving air deflects the finer and more feathery fiber dust particles out of the general course of fall of the coarser fibers in the stream of fiber, with the result that some of the deflected fiber dust particles land at a general location on the collecting surface different from that on which the coarser and less deflected particles are deposited, and other dust particles are actually removed from the cascade by the suction head.

As shown, the suction head is positioned to draw the fiber dust transversely of the main fiber cascade and in the direction opposite to the direction of movement of the collecting surface on mat forming conveyor 128. Consequently the fiber dust particles not actually carried away by the air stream fall on the collecting surface ahead of the coarse or body fibers and form a base layer of fine texture material, which becomes one surface of the final board product. It will be appreciated, of course, that this base layer of fiber dust is not a distinct, separate layer in the sense that it has a definite boundary plane in relation to the backing or core layer of the coarse body fibers, but that there is a gradation in fiber size which the lightest or finest dust fibers deflected to the greatest extent lie at the lower mat face or bottom, and progressively coarser fibers above these according to the relative amount of deflection imparted to them by the cross current of air.

A further feature of the invention is drawing off through the suction head a substantial proportion of the deflected fiber dust derived from the general dispersion stream produced by the saws 152, and depositing this fine dust as a covering layer on the upper surface of the preliminary mat, so that both faces of the board product will be of fine texture material. The volume and velocity of air flow into the suction head 158 are regulated by adjustment jointly or separately of the variable suction orifice bottom closure plate 160 and the variable air intake by-pass vents 162. Such regulation establishes the amount of fiber dust extracted from the fiber cascade and the relative proportions of fiber dust which fall directly on the collecting surface and that which is drawn off into the suction head. The latter proportion is moved by a pneumatic conveyor 164 to a dust fiber depositing unit 166 through a cyclone collector 168, for deposit by such unit as the covering layer on the preliminary mat.

Suction flow in the head 158 is created by the blower 170 driving air in the pneumatic conveyor 164. The amount of fiber dust material withdrawn by the suction head may be increased by increasing the blower speed or by closing the by-pass openings at 162. Lowering of the suction head vane 160 causes a wider deflection of dust fibers from the stream of fiber falling on the collecting surface and decreases the actual fiber dust intake of the suction head, because of the reduction of intake velocity in the head orifice as a result of such lowering of the vane. Preferably the rate of deposit of the fiber dust by the unit 166 is made substantially equal to the rate of withdrawal of dust into the suction head 158 from the stream, so that an excess will not accumulate in such fiber dust depositing unit.

Ideally, mat leveling should not be necessary if the relative rate adjustments and functioning of the various components which form the preliminary mat M were perfect, but as a practical matter some excess above actual desired mat thickness is produced in order to enable removal of inevitable mounds and depressions in different zones of the mat, by leveling. Because the fine texture covering layer C produced by the fiber dust dispenser 166 is usually thin in relation to the total preliminary mat thickness, leveling of the mat by removal of excess material is done at a leveling station 140 which is located ahead of the fiber dust depositing station 142, as shown in Figure 7, instead of past such depositing station. As a result of this arrangement, which avoids disturbing such covering layer by the leveling operation, the excess mat material removed at the leveling station consists chiefly of the coarse fibers at the top of the blanket layer M formed at the fiber dispersing station 130.

Figure 13:
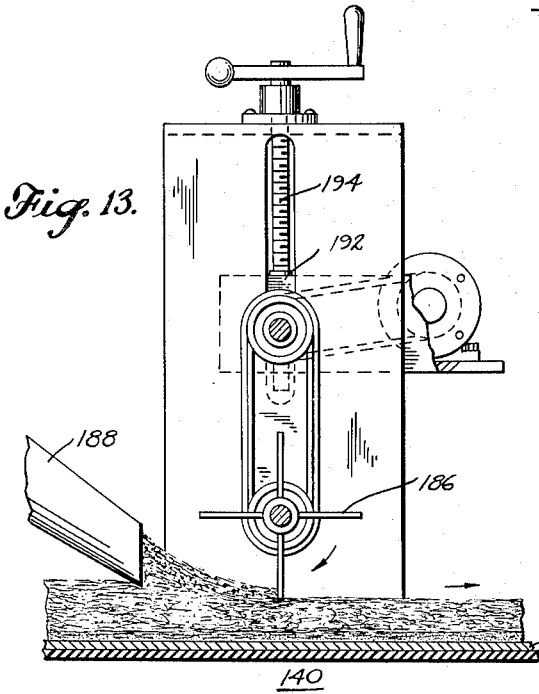
Figure 13 is an enlarged side elevation view of leveling mechanism appearing in the central portion of Figure 7.

The illustrated and preferred form of leveling apparatus, as shown in Figures 7, 8 and 13, comprises the rotary rake 186 having a plurality of radial teeth or arms arranged in rows, which sweep excess-thickness mat material from its top surface in a direction opposite to the direction of movement of the mat. For the sake of clear illustration the teeth of the rotary rake appear thicker and at greater spacing in the drawing than they actually are. Spring steel rods one-sixteenth inch thick and spaced one-eighth inch apart axially of the rotary rake are satisfactory for rake teeth. Continuous raking or combing of the mat by rotation of rake 186 removes the excess material without packing or otherwise disturbing the remaining material, producing a perfectly flat upper surface on the mat for almost its entire width, although small ridges may be left along opposite edges beyond the ends of the rakes.

The excess material raked from the surface of the mat is withdrawn by a suction head 188 and returned by a pneumatic conveyor 190 to the storage hopper 88 (Figure 1). Both the height of the rotary rake 186 and of the intake orifice of suction head 188 may be adjusted to accommodate mats of different desired thicknesses, the rake assembly being carried by vertically adjustable traversing nuts 192 engaged with traversing screws 194 as shown in Figure 8. A small winch 196 and lift cable 198 provides vertical adjustment for the suction head 188, as shown. As previously explained, the general thickness of the fiber mat deposited by the dispersing mechanism may be regulated, and the initial mat thickness should be just slightly greater than the height of the leveled mat for which the combining device is set.

The details of construction and operation of the fiber dust depositing unit 166 for coating with dust the leveled upper surface of the mat appear in Figures 9 and 10. Such unit comprises the elongated, generally rectangular sifting box 170, having a wire mesh screen bottom 172 overlain by a uniform-spreader grid 174 of diagonal parallel flat strips disposed on edge. The sifting box is suspended by links 176 for horizontal oscillation in the direction of its length, that is transversely to the line of mat travel. The box is shaken in this manner, to shower the dust fibers uniformly through its bottom screen, by a drive link 178 oscillated endwise by rotation of an eccentric 180 suitably driven. At the base of the cyclone collector 168, from which the fiber dust settles into the sifting box 170, is mounted a pair of oppositely rotated paddle wheels 182 (Figure 7), which fling the falling fiber dust transversely of their axis of rotation through the downwardly flared sifting box feed chute 184. Such a combination arrangement insures reasonably uniform distribution of the fiber dust in the sifting box, hence uniform depositing of the dust as a covering layer C on the mat (Figure 9).

Guards in the form of rubber strips 186 overlie the upper edge portions of the inner stretches of the respective side-retaining belts 156 to prevent the fiber dust falling outside the mat-forming space defined between the respective opposite belts. Such guards may tend to increase the dust deposit along the edges of the mat to increase the height of the small ridges C' along the opposite edges of the mat left by the combing operation. Such ridges should be removed and the side edges of the mat beveled to prevent the edges sloughing off after the mat moves out from between the edge-confining belts 156. Such ridge removal and edge-beveling is accomplished at station 146 by rotary cylindrical brushes 200 (Figures 7 and 14), the rotational axes of which are inclined upwardly both inwardly and rearwardly in relation to the direction of travel of the mat, as shown. The inward incline angle of the brushes is such as to remove the edge ridges C' and to bank off such mat sides at a sufficient angle from the vertical that they will not tend to slough off or fall away under any normal handling of the caul-supported mat en route to the curing press. The incline lengthwise of the direction of conveyor movement affords a slicing action along the edge and enables the fibrous material removed to drop free of the brush instead of accumulating along it as the material falls. The loose mat retains its form until pressed and cured without necessity for any prepressing operation as in earlier methods.

Preferably each rotary brush 200 is driven by a separate electric motor 202 through a belt and pulley transmission as shown. A receiving hopper 204 catches the excess fibrous material removed by the beveling brushes and a pneumatic conveyor 206 returns such material to the storage bin 88 (Figure 1).

As previously mentioned, at a point designated 144 in Figure 7, along the path of movement of the preliminary mat on conveyor 128, the board-length mat sections will be successively detached from the general body of the mat being formed by the apparatus. Such detachment of the board-length mat sections as the trailing edges of the respective supporting cauls reach that point results automatically from acceleration of the leading caul plate 120' on conveyor 148 relative to the succeeding end-abutted caul plate on conveyor 128. The leading caul plate undergoes such acceleration when a sufficient length of it has moved onto the more rapidly traveling offbear conveyor 148 to be subject to the latter's influence to a substantial degree, and the caul plate then starts to slip increasingly over the relatively slowly moving mat-forming conveyor 128.

The caul plate is thus accelerated progressively toward the speed of the offbear conveyor 148. During such acceleration period as overlap of the leading caul plate with the offbear conveyor 48 increases, slippage will occur between the caul plate and both the offbear conveyor and mat-forming conveyor 128, such slippage with respect to the former gradually decreasing and gradually increasing with respect to the latter. Simultaneously the mat portion on such accelerating caul plate will gradually be pulled gently from the mat portion in the caul plate next behind to sever such mat sections.

After the point is reached at which the caul plate is moving at the same speed as the offbear conveyor, slippage will then take place solely between the mat forming conveyor 128 and the portion of such caul plate still resting on it. Assuming that the coefficient of friction is uniform over all portions of the conveyor belts and all surface areas of the respective caul plates, the detaching point 144 at which the board-length mat section on each caul plate is torn from the general body of the mat, such detaching point will remain fixed. As a practical matter such point may shift somewhat lengthwise of the mat, but the particular location of such point is unimportant as there is no necessity for locating a cut-off tool or any other instrumentality by reference to it. It will be appreciated that this technique for detaching the board-length mat sections represents a considerable simplification over apparatus using cut-off saws or the like for a similar purpose. The torn ends of the mat sections are sufficiently regular or straight that tolerances need not be so large as to produce excessive waste by marginal trimming.

In Figure 11 a modified fiber dispersing unit is illustrated. In this case the bottom 96' of the hopper trough, which is transversely slotted centrally to receive the row of fiber-extracting saws 152' as before, is widened to accommodate a pair of screw conveyor elements 150'. These parallel screw conveyor elements are spaced apart somewhat to define an open feed channel 208 extending between them longitudinally of the hopper. These screw conveyor elements are rotated oppositely in the direction of the arrows, namely from the hopper bottom upward toward each other, and are convoluted oppositely, with the result that the fibrous material advanced by such elements longitudinally through the hopper is kept piled in the trough 208 directly over and upon all of the extracting saws, as shown, the object being to obtain greater uniformity in the rate of extraction of the material by the saws over the full length of the hopper.

In Figure 12 a further modification comprises a series of individual fibrous material dispersing units 96a, 96b and 96c, arranged in a row extending along the direction of movement of the collecting surface underlying such units. Such a series of units may be substituted for the single fiber dispersing unit shown in Figure 7, for example, as a means of increasing the production rate of the mat-forming system, by laying superposed multiple layers of fibrous materials. In that case each of the battery units preferably would be connected to receive fiber from a single supply source, such as the storage hopper 88, shown in Figure 1. A single suction head 158' deflecting fiber dust from the general dispersion cascade created by the first unit in the battery could be used to provide a fine texture covering layer thickness, if desired.

Alternatively such individual dispersing units may be connected to receive different types of fibrous material as a means of forming a composite mat made up of layers with different properties. For example, the first unit 96a may be supplied with fibrous material produced from fir wood, the second unit 96b with glass wool fibrous material, and the third of the three units with fibrous material from red cedar or other wood. When the mat is cured under heat and pressure these layers become integrated into a solid board having a heat-resistant semi-resilient core layer and contrasting surface layers, the specific properties depending on the binder and curing process employed.

A second example of composite fiber mat which may be produced by such a series of dispersing units is one having a first layer of resin-impregnated fir fibers, a second layer of rubber latex compound impregnated fibers, and a third layer of resin-impregnated pine fibers, for example. In this case the presence of the rubber latex compound, vulcanized during the heating-pressing operation of the mat, will have relatively hard surface layers and a cushioning core layer.

After the preliminary mat produced by the herein described method and apparatus has been cured in a suitable press, it will usually be desirable to subject the final board product to a humidification or moisture-normalizing process. As a further feature of the present over-all process for the manufacture of fiberboard products such moisture-normalizing may be accomplished by a hot press and suitable means such as moistening rolls, for applying water to both surfaces of the board. The water is applied to the board while it is still hot from the heating and pressing operation of the curing press. As a result of this inherent heat in the board the applied moisture penetrates into the pores of the board in the form of wet steam.

The wetted boards are then placed between the heated platens of a suitable press, either individually or in groups not too great in thickness, and held under pressure somewhat lower than the pressure of the curing press, and at a temperature between 220° F. to 260° F., for approximately the same period of time as the board curing time. For example, if a board product has been cured under 400 pounds per square inch pressure at 290° F. in a press for ten minutes, then the humidifying cycle will also be ten minutes at about 300 pounds per square inch pressure and about 240° F. in the case of five ⅛-inch thick boards stacked between the hot platens of the humidifying press. As a second example, if a board has been cured at 300 pounds per square inch pressure at a temperature of 285° F. for about twelve minutes in the curing press, then the humidifying cycle will be twelve minutes at 200 pounds per square inch pressure and a temperature of 235° F. The point is that a very hard and dense end product requires a longer humidification period than a softer board to compensate for the greater hardness and density of the board.

I claim as my invention:

1. Apparatus for forming a mat from fibrous material including a substantial proportion of relatively fine dust fibers interspersed among relatively coarse and heavy body fibers, said apparatus comprising a generally horizontal collecting surface, fiber dispersing means operatively disposed above said collecting surface and operable to shower fibrous material thereon in a steady stream of intermingled dust fibers and body fibers, conveyor means operable to effect relative progressive movement between said collecting surface and said dispensing means, edgewise of said surface, air-moving means mounted directly above said collecting surface generally adjacent to said dispersing means and directed at the fiber stream emanating therefrom generally crosswise thereof, said air-moving means being operable to create airflow having a carrying force sufficient to deflect a substantial proportion of the fine dust fibers from the course of said stream to a course of fall offset therefrom, thereby to deposit superposed fine dust fiber and coarse body fiber layers on the moving collecting surface.

2. The mat forming apparatus defined in claim 1, wherein the air-moving means comprises a suction means operatively positioned to draw the fine dust fibers from the fiber stream in the direction opposite that in which the collecting surface is moving relative to the stream, whereby such fine dust fibers thus deflected from such stream fall on the collecting surface prior to the coarse body fibers and form a layer below the body fiber layer.

3. The mat forming apparatus defined in claim 2, and additionally comprising dust fiber means operatively disposed above the moving collecting surface on the offbear side of the fiber dispersing means and operable to sprinkle dust fibers on the body fiber layer.

4. The mat forming apparatus defined in claim 3, wherein the suction means comprises a suction head operable to draw into it a selected appreciable proportion of the dust fibers deflected from the stream of fibers, and means continuously conveying such intake of dust fibers from said suction head for delivery to the dust fiber dispersing means.

5. The mat forming apparatus defined in claim 4, and means cooperating with the suction head to vary the amount of dust-fiber-attracting flow into it to alter the quantity of dust fibers deflected from the stream of fibers.

6. The mat forming apparatus defined in claim 5, wherein the suction head includes an intake orifice through which the dust fibers are drawn into the head, and means operable to vary the size of the effective opening into said intake orifice, and thereby further to alter the quantity of dust fibers deflected from the stream of fibers.

7. Apparatus for forming a mat from fibrous material including a substantial proportion of relatively fine dust fibers interspersed among relatively coarse and heavy body fibers, said apparatus comprising a generally horizontal collecting surface, fiber dispersing means above said collecting surface and operable to shower fibrous material thereon in a steady stream of intermingled dust fibers and body fibers, conveyor means operable to effect relative progressive movement between said collecting surface and said dispersing means, edgewise of said surface, suction means mounted directly above said collecting surface generally adjacent to said dispersing means and directed at the fiber stream emanating therefrom generally crosswise thereof, said suction means being operable to withdraw a substantial proportion of the fine dust fibers from the course of said stream, dust fiber depositing means operatively disposed above the moving collecting surface on the offbear side of said fiber dispersing means and operable to sprinkle dust fibers on the mat deposited by said fiber dispersing means, and means continuously conveying said withdrawn dust fibers from said suction means to said dust fiber depositing means for deposit thereby on such mat.

8. The mat forming apparatus defined in claim 7, and mat leveling means located between the fiber depositing means and the dust fiber dispersing means, above the collecting surface, said mat leveling means including rotary toothed means operable to rake excess fibrous material from the top of the mat passing said leveling means to establish a predetermined mat thickness corresponding to the vertical spacing between the rake teeth and the moving collecting surface.

9. The mat forming apparatus defined in claim 8, and suction means directed toward the rotary toothed means and having suction force sufficient to withdraw fibrous material swept from the mat by such toothed means but not sufficient to remove undisturbed fibrous material from the mat surface in appreciable quantities.

10. The method of forming a mat from particles in substantially dry state and including a substantial proportion of relatively fine particles interspersed among relatively coarse and heavy body particles, which comprises projecting downward toward a generally horizontal collecting surface a stream including intermingled fine and body particles, while thus projecting such stream, effecting progressively relative generally horizontal movement between such stream and collecting surface, creating an air current moving transversely through such particle stream above such collecting surface and thereby displacing a substantial proportion of the fine particles from such particle stream, and continuously depositing on the same collecting surface, at a location offset from the depositing location of body particles from the stream, fine particles thus displaced from the stream of particles, and thus depositing on the collecting surface superposed layers of fine particles and of body particles.

11. The method of forming a mat from fibrous particles in substantially dry state and including a substantial proportion of relatively fine dust particles interspersed among relatively coarse and heavy body fibers, which comprises projecting downward toward a generally horizontal collecting surface a stream including intermingled dust particles and body fibers, while thus projecting such stream, effecting progressively relative generally horizontal movement between such stream and collecting surface, creating an air current moving transversely through such stream of particles and fibers above such collecting surface and thereby displacing a substantial proportion of the fine dust particles from such stream, and continuously depositing on the same collecting surface, at a location offset from the depositing location of body fibers from the stream, fine dust particles thus displaced from the stream of fibers, and thus depositing on the collecting surface superposed layers of fine dust particles and of body fibers.

12. The method of forming a mat from particles in substantially dry state and including a substantial proportion of relatively fine particles interspersed among relatively coarse and heavy body particles, which comprises projecting downward toward a generally horizontal collecting surface a stream including intermingled fine and body particles, while thus projecting such stream, progressively moving such collecting surface generally horizontal in one direction, creating an air current moving transversely through such stream above such collecting surface and generally horizontally in the direction opposite such movement of the collecting surface and thereby displacing a substantial proportion of the fine particles from such stream in a direction opposite the direction of movement of such collecting surface, and continuously depositing on the same collecting surface, at a location offset contra to the direction of collecting surface movement from the depositing location of body particles from the stream, fine particles thus displaced from the stream of particles, and thus depositing on the collecting surface a lower layer of fine particles and an upper layer of body particles.

13. The method of forming a mat from particles in substantially dry state and including a substantial proportion of relatively fine particles interspersed among relatively coarse and heavy body particles, which comprises projecting downward toward a generally horizontal collecting surface a stream including intermingled fine and body particles, while thus projecting such stream, effecting progressively relative generally horizontal movement between such stream and collecting surface, creating an air current moving transversely through such particle stream above such collecting surface and thereby withdrawing a substantial proportion of the fine particles from such particle stream, and continuously depositing on the same collecting surface, at a location offset beyond the depositing location of body particles from the particle stream in the direction of movement of the collecting surface, fine particles thus withdrawn from the stream of particles, and thus depositing on the collecting surface a lower layer of body particles and an upper layer of fine particles.

14. The method of forming a fibrous mat comprising reducing ligno-cellulose material in green-wet condition to particles including a substantial proportion of relatively fine dust fibers interspersed among relatively coarse and heavy body fibers, drying the fibers and thereby substantially reducing their moisture content, projecting downward toward a generally horizontal collecting surface a stream including intermingled dust and body fibers, while thus projecting such stream, effecting progressively relative generally horizontal movement between such stream and collecting surface, creating an air current moving transversely through such stream of fibers above such collecting surface and thereby displacing a substantial proportion of the fine dust fibers from such stream, and continuously depositing on the same collecting surface, at a location offset from the depositing location of body fibers from the stream, fine dust fibers thus displaced from the stream of fibers, and thus depositing on the collecting surface superposed layers of fine dust fibers and of body fibers.

15. The method of making a mat which comprises depositing material in a mat on a generally horizontal supporting bottom surface and between upright retaining side surfaces adjoining such bottom surface, effecting relative separation of said retaining side surfaces and the sides of said formed mat and thereby exposing such mat sides, and beveling such exposed mat sides by removing side material therefrom and thereby forming a mat cross section tapering away from such supporting bottom surface.

16. The method of making a mat which comprises depositing material in a mat on a generally horizontal supporting bottom surface and between upright retaining side surfaces adjoining such bottom surface, effecting relative separation of said retaining side surfaces and the sides of said formed mat and thereby exposing such mat sides, and brushing such exposed mat sides and thereby removing more material from portions of such sides farther from such supporting bottom surface than closer to such surface, and thereby forming a mat cross section tapering away from such supporting bottom surface.

17. Apparatus for producing a mat, comprising a collecting surface, means above said surface operable to deposit mat-forming material thereon, upright retaining side surfaces adjoining such collecting surface and projecting upwardly therefrom to retain the mat material thereon at the sides, means supporting such surface and operable to move it edgewise from a material receiving position between said retaining side surfaces to a location beyond such side surfaces, and spaced mat beveling means stationed in the line of movement of opposite sides of the mat beyond said side surfaces and operable during advancement of such mat therebetween to bevel the sides of such mat for producing a mat cross section tapering away from said collecting surface.

18. The apparatus defined in claim 17, wherein the beveling means comprise generally upright cylindrical rotary brushes having their rotational axes converging upwardly, and means operable to turn said brushes in a direction to brush the mat sides opposite to the direction of mat movement and thereby sweep in a direction opposite to the direction of mat travel mat material removed from the mat slides.

19. The method of forming mat units which comprises depositing material in a continuous mat on a series of edge-abutting collecting plates, advancing such series of plates progressively edgewise past the material depositing location and to a separating location, and, as each plate arrives at such separating location, accelerating its movement in the same direction and thereby moving it away from edge-abutting relationship with the next following plate of the series and thereby separating the mat portion on such accelerated plate into a mat section separate from the continuous length of mat on the following, edge-abutted plates of the series.

20. In apparatus for forming a mat from fibrous material in substantially dry state, fiber dispersing mechanism comprising a collecting hopper for fibrous material having a trough with a row of elongated transverse slots in the bottom thereof spaced lengthwise of the trough, a pair of parallel screw conveyor means extending longitudinally through said trough and rotated to move fibrous material progressively along such trough past said openings, and a plurality of toothed rotary members having upper peripheral portions projecting into said trough through said openings, respectively, and between such parallel conveyor means, and operable to extract fibrous material from the hopper and deposit it.

21. Apparatus for forming a mat from comminuted material comprising a generally horizontal collecting surface, material depositing means above said collecting surface and operable to shower material particles thereon, conveyor means operable to effect gradual progressive movement of said collecting surface past said material depositing means edgewies of said surface, mat leveling means located beyond the location at which particles are deposited by said material depositing means in the direction of movement of the collecting surface, disposed above the collecting surface and operable to remove material from the upper surface of the mat to establish a predetermined mat thickness, and suction means directed toward said mat leveling means and having suction force sufficient to withdraw material particles removed from the mat by said mat leveling means but inoperative to remove undisturbed material from the mat surface in appreciable quantities.

22. Mat forming apparatus comprising a collecting surface, means operable to move said collecting surface progressively edgewise substantially horizontally, and a series of fibrous material depositing devices located at intervals along the path of advance of said collecting surface, each of said devices including a trough-bottom hopper located directly above said collecting surface, extending transversely in relation to the line of advance of the supporting surface, and having a plurality of spaced, parallel elongated openings in its bottom, such individual openings extending generally parallel to the line of advance, screw conveyor means extending through the hopper bottom longitudinally thereof to move fibrous material through such bottom past said openings, and a plurality of toothed rotary members having their upper peripheral portions projecting upwardly into said hopper bottom through said openings to extract fibrous material from the hopper by rotation of said toothed members and scatter such material uniformly on the moving collecting surface thereunder, successive devices being operable to deposit fibrous material on top of material previously deposited on said collecting surface to form multiple layers upon said collecting surface during its advance past said series of dispersing devices.

23. Mat forming apparatus comprising a collecting surface, means operable to move said collecting surface progressively edgewise substantially horizontally, a series of fibrous material depositing devices located at intervals along the path of advance of said collecting surface, each of said devices being located directly above said collecting surface, successive devices being operable to deposit fibrous material on top of material previously deposited on said collecting surface to form multiple layers upon said collecting surface during its advance past said series of dispersing devices, and a common supply source of fibrous material continuously feeding such material to each of the fibrous material dispersing devices.

References Cited in the file of this patent
UNITED STATES PATENTS

| Number | Name | Date |
|---|---|---|
| 1,843,915 | Codwise | Feb. 9, 1932 |
| 2,067,012 | Loetscher | Jan. 5, 1937 |
| 2,068,203 | Simpson | Jan. 19, 1937 |
| 2,217,538 | Carson | Oct. 8, 1940 |
| 2,276,869 | Pond | Mar. 17, 1942 |
| 2,282,477 | Joa | May 12, 1942 |
| 2,316,451 | Page | Apr. 13, 1943 |
| 2,490,766 | Abbott | Dec. 13, 1949 |
| 2,510,229 | Joa | June 6, 1950 |
| 2,548,095 | Bowers | Apr. 10, 1951 |
| 2,579,770 | Uschmann | Dec. 25, 1951 |
| 2,581,069 | Bertolet | Jan. 1, 1952 |
| 2,624,079 | Duvall | Jan. 6, 1953 |
| 2,635,301 | Schubert et al. | Apr. 21, 1953 |
| 2,642,371 | Fahrni | June 16, 1953 |